United States Patent [19]
Kelly et al.

[11] Patent Number: 5,136,552
[45] Date of Patent: Aug. 4, 1992

[54] METOD OF GEOPHYSICAL EXPLORATION

[75] Inventors: Michael C. Kelly, Sand Springs; Richard O. Lindsay, Tulsa, both of Okla.; Steven R. Clawson, Lakewood, Colo.

[73] Assignee: Amoco Corporation, Chicago, Ill.

[21] Appl. No.: 602,606

[22] Filed: Oct. 24, 1990

[51] Int. Cl.$^5$ .............................................. G01V 1/28
[52] U.S. Cl. ........................................ 367/47; 367/38; 367/49
[58] Field of Search ................. 367/43, 44, 47, 59, 367/60, 70, 38, 49; 364/421

[56] References Cited

U.S. PATENT DOCUMENTS

| | | | |
|---|---|---|---|
| 2,279,191 | 4/1942 | Adler | 367/49 |
| 3,292,143 | 12/1966 | Russell | 367/44 |
| 3,781,785 | 12/1973 | Balch | 367/70 |
| 4,206,509 | 6/1980 | Ruelle | 367/42 |
| 4,279,026 | 7/1981 | Lanbright et al. | 367/70 |
| 4,312,050 | 1/1982 | Lucas | 367/44 |
| 4,486,864 | 12/1984 | Ongkiehong et al. | 367/23 |
| 4,646,239 | 2/1987 | Bodine et al. | 367/47 |
| 4,694,438 | 9/1987 | Sengupta | 367/70 |
| 4,755,972 | 7/1988 | Hanson et al. | 367/75 |
| 4,779,237 | 10/1988 | Bodine | 367/47 |
| 4,876,673 | 10/1989 | McGowan | 367/68 |

Primary Examiner—Ian J. Lobo
Attorney, Agent, or Firm—Timothy D. Stanley

[57] ABSTRACT

A method of geophysical exploration is provided for identifying and evaluating stratigraphic prospects associated with step-like changes in elastic impedance from gradational changes in elastic impedance. In particular, the seismic data are bandpass filtered with a plurality of filters each having a different pass band. Measures of the amplitude are obtained for selected reflection events in the seismic data as a function of their associated pass band frequency content. The changes in amplitude as a function of changes in frequency content of the reflection event can thus be employed to identify and evaluate subtle stratigraphic prospects in the seismic data.

15 Claims, 6 Drawing Sheets

METOD OF GEOPHYSICAL EXPLORATION

BACKGROUND OF THE INVENTION

The present invention relates generally to geophysical exploration and, more particularly, to methods for identifying and evaluating stratigraphic prospects in seismic data associated with gradational changes in elastic impedance.

In the continuing search for hydrocarbons contained in the earth's subterranean formations, explorationists and geophysicists have developed numerous techniques for imparting seismic wave energy into the earth's subterranean formations; recording the returning reflected and refracted seismic wave energy; and processing the recorded seismic wave energy to produce seismic signals or traces. Such seismic signals or traces contain reflection events representative of the structure of the earth's subsurface formations. The reflection events can also include a multiplicity of information, for example, frequency, amplitude, phase, etc., which can be related to stratigraphic features of the formation (e.g., lithology and pore fluid content). Recently, geophysicists' interest has turned to evaluating high intensity amplitude and variations in a seismic signal amplitude as a function of range or offset for selected reflection events. Exemplary of such focus are Bodine U.S. Pat. No. 4,779,237 and Bodine et al., U.S. Pat. No. 4,646,239. Such bright spot analysis techniques have been used primarily as a pore fluid indicator, and especially as an indicator of gas reservoirs in the Gulf of Mexico.

In general, seismic exploration prospects in a display of seismic data can be categorized as either structural or stratigraphic. The former are generally more obvious in displays of the seismic signals while the latter can be subtle and hard to find. Structural prospects relate to the general disposition, altitude, arrangement, or relative position of formation masses depicted by reflection events in the seismic data; whereas, stratigraphic prospects relate to predicting lithology, depositional environment, and interstitial fluids based on further evaluating and interpreting the reflection events themselves. The current trend in exploration geophysics is to acquire seismic data having higher frequency content in order to achieve better resolution of both subtle stratigraphic and structural prospects depicted in displays of the seismic signals.

After appropriate preprocessing of seismic data, generally two types of seismic sections or displays of the seismic signals can be produced. The first are automatic gain control (AGC) seismic sections for mapping structure, and the second are true amplitude seismic sections for evaluating stratigraphic prospects such as anomalous amplitude events, i.e., bright spots. The frequency content of true amplitude seismic sections is generally made as broad as possible in the belief that increasing the frequency content will provide better resolution of subtle stratigraphic prospects.

Changes in elastic impedance from one formation to another result in the imparted seismic energy being reflected and refracted. Generally, exploration geophysicists have assumed such changes in elastic impedance are step-like changes such as A and D in the display of impedance Z as a function of time shown in FIG. 1. As a consequence, the apparent amplitude of reflection events A′ and D′ in synthetic seismic signals T associated with such step-like changes in elastic impedance are generally equal to the reflection coefficient. Moreover, increasing the frequency content of the imparted seismic energy has been shown to improve the resolution of reflection events associated with such step-like changes in elastic impedance.

Figure 1:
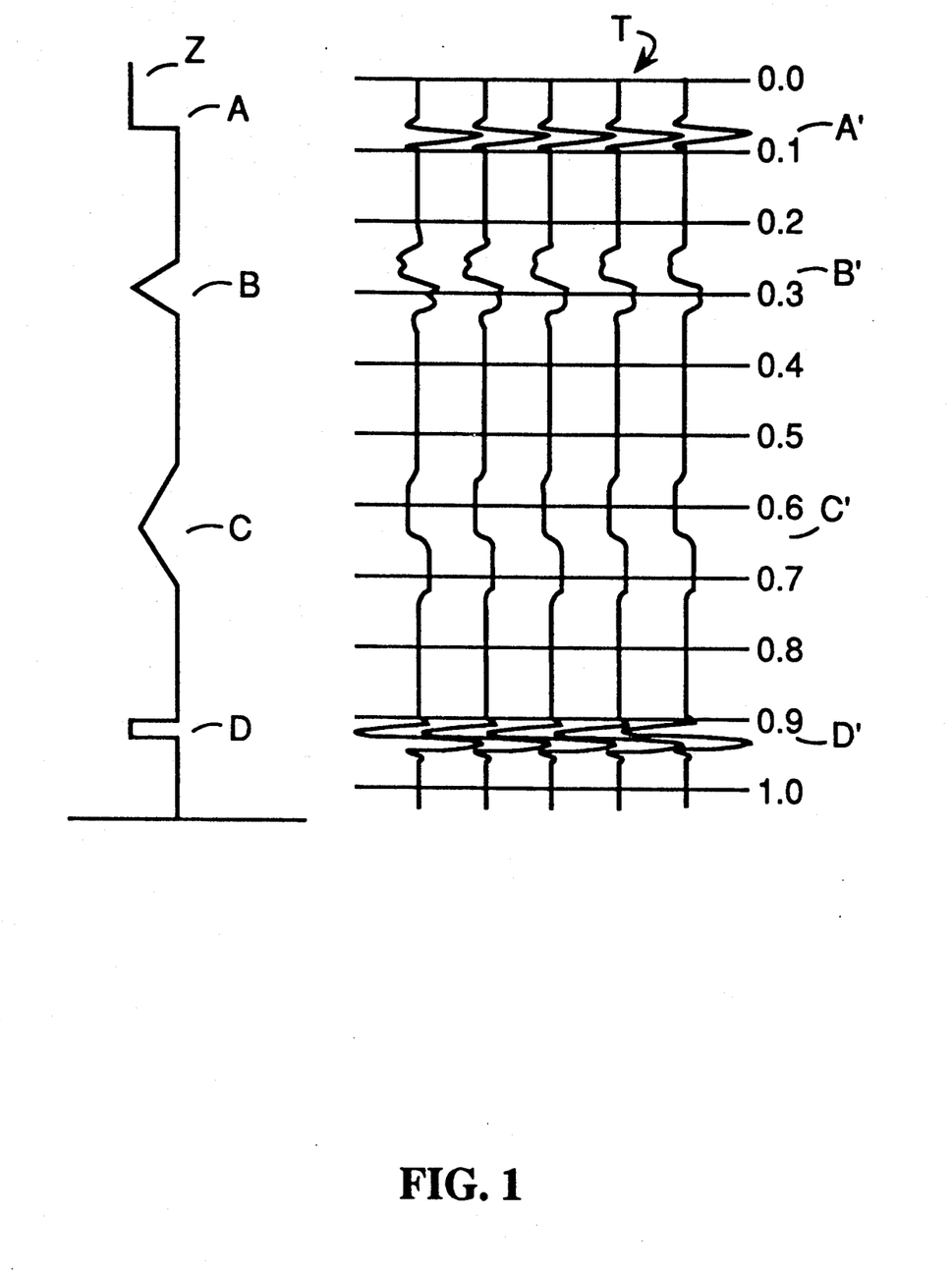
FIG. 1 is a schematic representation of changes in elastic impedance in the earth and a set of synthetic seismic signals having seismic reflection events representative of the reflection of seismic energy from such changes in elastic impedance.

However, we have found that in the case of formations having a gradational change in elastic impedance, such as represented by B and D in the impedance function Z in FIG. 1, the use of higher-frequency content seismic energy can result in the apparent amplitudes of corresponding reflection events B′ and C′ in synthetic seismic signals T which are much less than one would have expected from a step-like change in elastic impedance having the same overall change as the gradational change in elastic impedance. Consequently, high resolution seismic acquisition techniques are not best suited for revealing stratigraphic prospects associated with gradational changes in elastic impedance. However, we have discovered novel methods for identifying and evaluating stratigraphic prospects in the seismic data associated with gradational changes in elastic impedance from those associated with step-like changes which advantageously employ the apparent liability of high resolution seismic acquisition techniques, as shall be more fully described below.

SUMMARY OF THE INVENTION

Novel methods of geophysical exploration are provided for identifying and evaluating stratigraphic prospects in seismic data. More particularly, the present invention provides a method for distinguishing reflection events associated with gradational changes in elastic impedance from those associated with step-like changes in elastic impedance. Seismic data are filtered with a plurality of bandpass filters. For selected reflection events in the bandpass filtered seismic data, measures of the changes in amplitude as a function of the frequency content are obtained. These measures can then be used to distinguish reflection events associated with step-like changes from those associated with gradational changes in elastic impedance.

In one embodiment, a plurality of bandpass filters, each having progressively wider pass bands, are impressed on a set of seismic data. A measure of the amplitude for selected reflection events in each of the bandpass filtered seismic data is obtained and plotted as a function of the frequency content of its associated pass band. The measures of the change in amplitude as a function of the frequency content can be curve fitted to a linear expression of frequency content. The resulting coefficients of fit can be related to a measure of the rate of change in amplitude ($w_1$) as well as a measure of the magnitude of change in elastic impedance ($w_0$). With the measures $w_0$ and $w_1$, reflection events associated with gradational and step-like changes in elastic impedance can be distinguished one from the other. In another embodiment, a difference in amplitude for selected reflection events can be obtained from different sets of the bandpass filtered seismic data. The measures of change can also be color coded and plotted with the original seismic data to provide a graphical means for locating and identifying selected stratigraphic prospects.

Having distinguished reflection events associated with gradational changes in elastic impedance from those associated with step-like changes in elastic impedance, such information can be used in a plurality of ways to further evaluate and process the seismic data including locating anomalous changes in pore fluid pressures as well as zero phasing the seismic data. These and other features of the present invention are more fully described in the following description as well as the accompanying figures.

DETAILED DESCRIPTION OF THE INVENTION

In order to better understand the present invention, the following introductory discussion is provided. Generally, seismic exploration comprises imparting seismic energy into the earth and recording the earth's response thereto. Both compressional and shear wave seismic energy can be imparted into the earth employing a variety of seismic sources. When impedance changes from one formation to the next are encountered by the imparted seismic energy, the seismic energy can be partially reflected. A ratio ($A_r/A_i$) of the amplitude of the reflected seismic energy $A_r$ to the amplitude of the imparted seismic energy $A_i$ can be related to changes in the formation impedance at such reflecting interface. For normal incidence compressional seismic wave energy, this relation can be expressed as:

$$A_r/A_i = \frac{\alpha_1 \rho_1 - \rho_2 \alpha_2}{\alpha_1 \rho_1 + \alpha_2 \rho_2} \quad (1)$$

where $\alpha_k$ is the compressional wave seismic velocity for formation k; $\rho_k$ is the density of formation k; and $\alpha_k \rho_k$ is the elastic impedance of formation k.

However, Equation (1) is predicated on the assumption that changes in elastic impedance are step-like as depicted by the changes in elastic impedance A and D in the impedance function Z of FIG. 1. Looking at corresponding reflection events A' and D' in synthetic seismic signals T in FIG. 1, one can see that for generally the same change in elastic impedance, one obtains reflection events having generally the same amplitude. Typically, step-like changes in elastic impedance are associated with abrupt changes in formation lithology. As a matter of note, the synthetic seismic signals T in FIG. 1 were filtered with a broad pass band (0-0-50-100 Hz) filter.

Surprisingly, we have found that gradational changes in elastic impedance B and C depicted in the impedance function Z of FIG. 1, representing the same overall change in elastic impedance as A and D, can result in corresponding reflection events B' and C' having greatly diminished amplitude. We have also observed that such gradational changes in elastic impedance are generally associated with mixed transition zones between distinct formation lithologies. As a consequence, reflection events associated with gradational changes in elastic impedance can be harder to locate than reflection events associated with step-like changes in elastic impedance, especially when high resolution seismic acquisition techniques are employed (i.e., the seismic data include a relatively broad band of frequencies). In fact, the differences in amplitude for the reflection events depicted in FIG. 1 clearly highlight why explorationists have employed high frequency content seismic data for detecting reflection events associated with step-like changes in elastic impedance and surprisingly, how such acquisition techniques can hinder identifying reflection events associated with gradational changes in elastic impedance.

A very important consequence of such difference in amplitude variation is our recent observation that certain stratigraphic prospects observed in seismic data, especially in the Gulf of Mexico, have been found to be associated with hydrocarbon containing formations in the earth's subsurface. In particular, many such stratigraphic prospects have been found to be associated with gradational changes in elastic impedance rather than step-like changes. Consequently, we believe many hydrocarbon containing stratigraphic prospects, associated with gradational changes in elastic impedance, may have been overlooked because of the diminished amplitudes of their corresponding reflection events. Additionally, we have discovered that anomalous increases in pore fluid pressure (i.e., greater than hydrostatic) can also be associated with gradational changes in elastic impedance. Thus, locating and identifying stratigraphic prospects associated with gradational changes in elastic impedance, amongst a plurality of reflection events in the seismic data can be extremely important.

Figure 2:
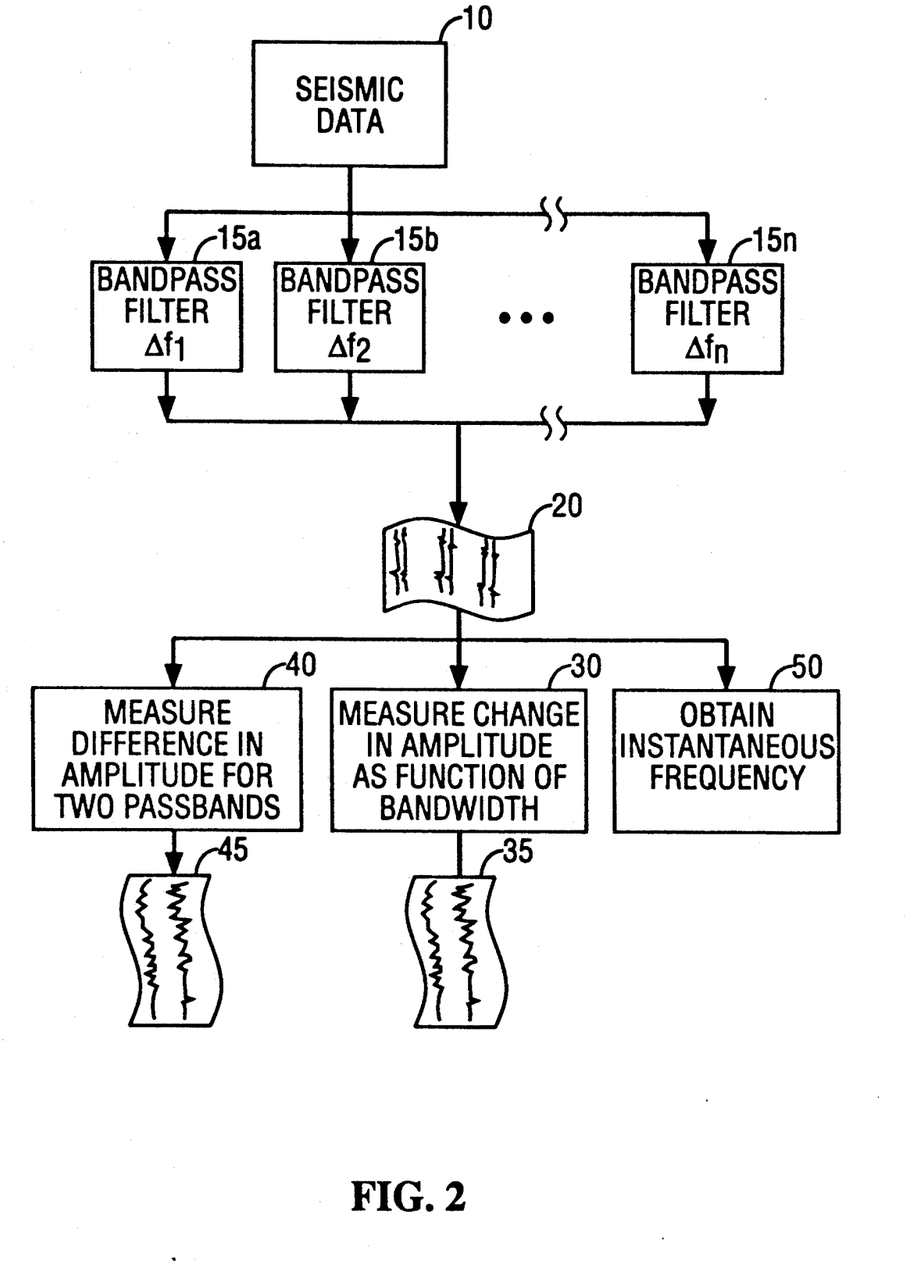
FIG. 2 is a flow diagram of the present invention.

Looking now to FIG. 2, a flow diagram of the present invention is provided. At step 10, a set of seismic data is obtained. Preferably, the seismic data comprise normal moveout (NMO) corrected and stacked seismic signals. At steps 15a, 15b, ..., 15n, a set of N bandpass filters are provided for separately bandpass filtering the set of seismic data. The N bandpass filters are adapted to separately bandpass filter the set of seismic data. Moreover, the N bandpass filters are adapted to pass separate frequency bands, $\Delta f_1, \Delta f_2, ..., \Delta f_n$, of the seismic data. While numerous methods are available for bandpass filtering seismic data, it is preferred that the N band-pass filters have overlapping pass bands $\Delta f_i$, (e.g., $\Delta f_1 = 5-15$ Hz and $\Delta f_2 = 10-20$ Hz), although the use of bandpass filters having adjacent pass bands $\Delta f_i$ (e.g., $\Delta f_1 = 5-15$ Hz and $\Delta f_2 = 15-25$ Hz) can also be effectively employed. Additionally, the bandpass filters can have pass bands $\Delta f_i$ which comprise either an upsum series (e.g., $\Delta f_1 = 5-15$ Hz, $\Delta f_2 = 5-25, ..., \Delta f_n = 5-100$ Hz) wherein the lower frequency of each pass band is the same or a downsum series (e.g., $\Delta f_1 = 5-100$ Hz, $\Delta f_2 = 25-100$ Hz, ..., $\Delta f_n = 90-100$ Hz) wherein the upper frequency of each pass band is the same. Although bandpass filters are typically described by their preferred passband (i.e., $\Delta f$), they are, in fact, more properly described with a ramp up and ramp down range of frequencies, e.g., $F_1$, $F_2$, $F_3$, $F_4$ where the pass band $\Delta f = F_3 - F_2$, while $F_1$ to $F_2$ and $F_3$ to $F_4$ describe the ramp up and ramp down ranges, respectively, and $F_4 \geq F_3 > F_2 \geq F_1$.

Figure 3:
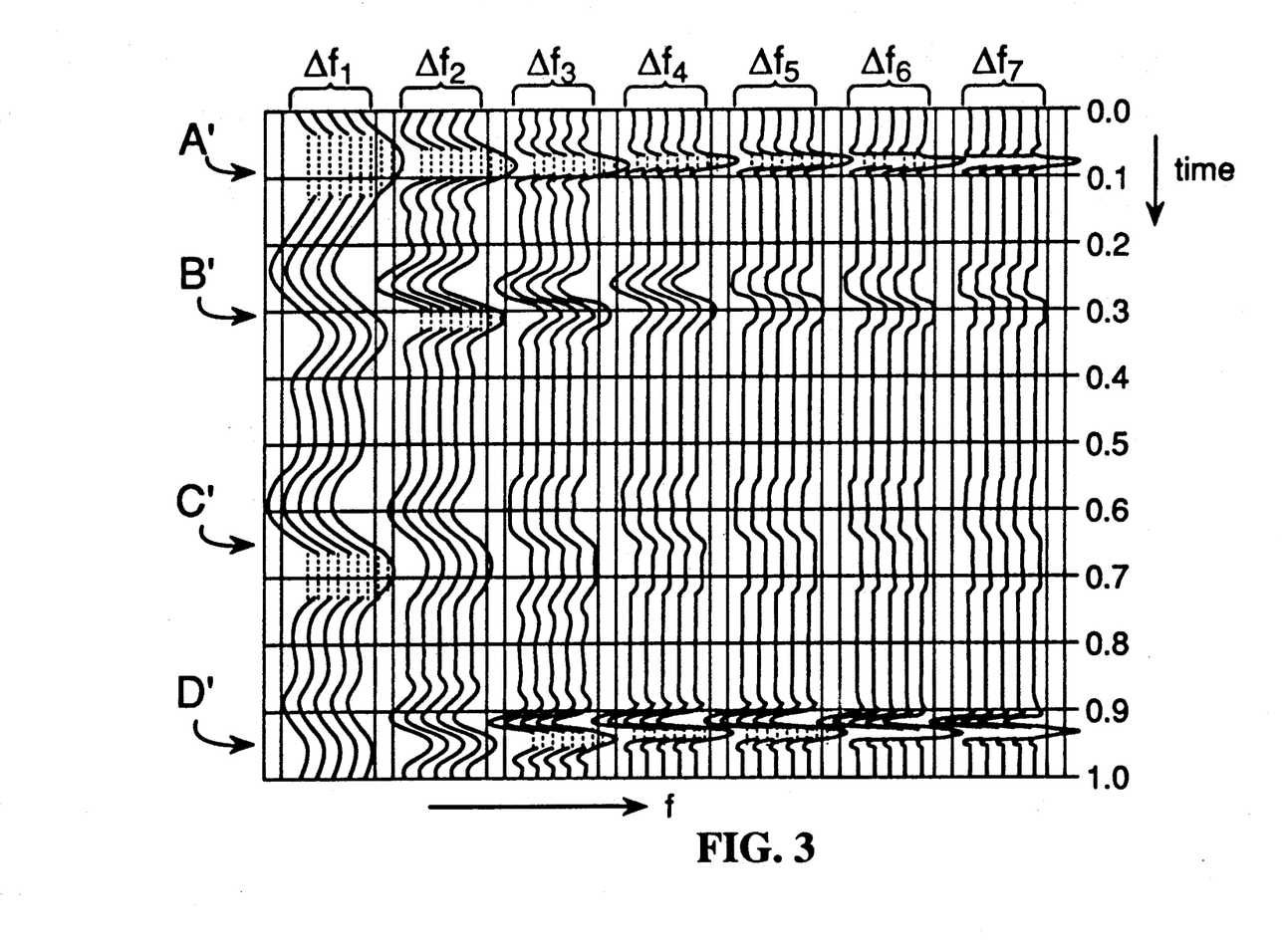
FIG. 3 is a display of bandpass filtered synthetic seismic signals as a function of the increasing frequency content of each bandpass.

At step 20, the bandpass filtered seismic data can be displayed in a frequency sequenced arrangement as depicted in FIG. 3. In particular, FIG. 3 is representative of seven different sets of bandpass filtered seismic data obtained from the seismic data of FIG. 1. The frequency content of each bandpass filtered set of seismic data increases progressively from left to right. The bandpass filter comprises an upsum series of filters ranging from (0, 4, 12, 22 Hz) to (0, 4, 60, 70 Hz) with the pass band $\Delta f$ increasing in multiples of 8 Hz. Generally, this increase in frequency content of the seismic data can be seen in the reflection events labeled A' and D' as well as the beneficial increase in resolution resulting therefrom. Both reflection events A' and D' in FIG. 3 are associated with the step-like changes A and D in the impedance function Z depicted in FIG. 1. However, reflection events B' and C' in FIG. 3, both of which are associated with gradational changes B and C in the impedance function Z, not only do not show any substantial increase in resolution with increasing frequency content but show decreasing amplitude as the frequency content increases to higher frequencies. Consequently, displays such as FIG. 3 can be employed to distinguish reflection events associated with step-like changes in elastic impedance from those associated with gradational changes in elastic impedance.

At step 30 of FIG. 2, a measure of the amplitude for selected reflection events in each of the bandpass filtered seismic data can be obtained. Alternatively, the amplitude envelope can first be calculated for each bandpass filtered set of seismic data and then a measure can be obtained of the amplitude for the associated reflection events therein. The amplitudes measured can then be associated with a measure of the frequency content of their respective bandpass filter. In one embodiment, the amplitudes are associated with a function fu of the frequency content of each pass band which represents an average of the upper frequencies of each bandpass filter $F_1$, $F_2$, $F_3$, $F_4$ where $fu=(F_3+F_4)/2$.

Figure 4:
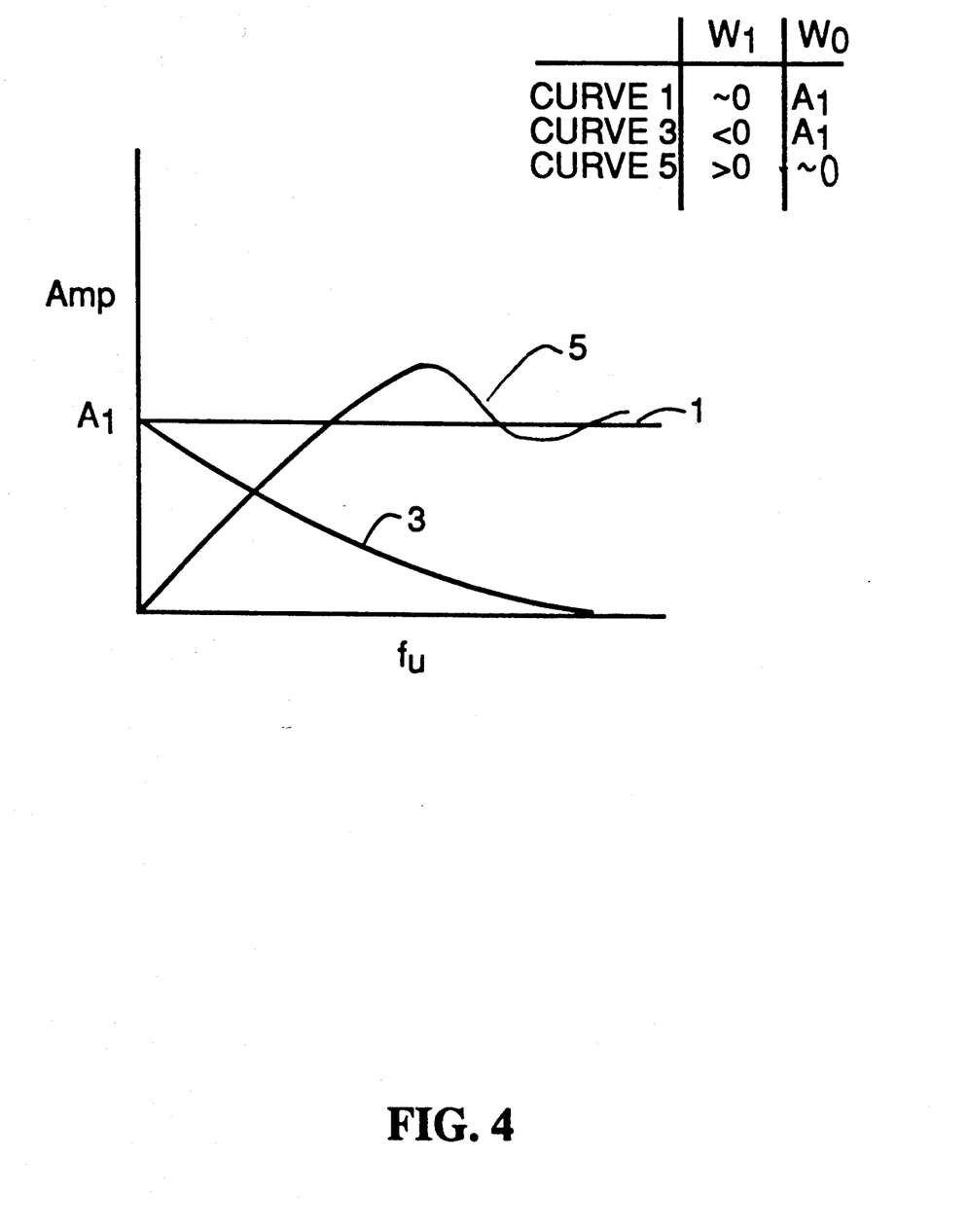
FIG. 4 is a plot of amplitude for selected reflection events as a function of bandpass frequency.

The measures of amplitude can be plotted as a function of the frequency content fu as depicted in FIG. 4. A linear approximation of the variation in amplitude as a function of the frequency content A(f) can be obtained by curve fitting such data to the following:

$$A(f) = w_0 + w_1 fu \quad (2)$$

where $w_0$ and $w_1$ are coefficients of fit and $w_1$ can be related to the rate of change of amplitude as a function of frequency content and $w_0$ can be related to a measure of the magnitude of change in elastic impedance (i.e., $\Delta Z$).

If when examining amplitudes for reflection events that can be positive or negative, we begin by taking the absolute value of the amplitudes. Thus, it has generally been found that reflection events associated with gradational changes in elastic impedance have values of $w_1 < 0$ as shown in FIG. 4. Similarly it has been found that reflection events associated with step-like changes in elastic impedance generally have values of $w_1 \sim 0$, or at least less negative than those associated with gradational changes in elastic impedance.

In particular, curve 1 in FIG. 4 generally represents the variation in amplitude of reflection event A' in FIG. 3, curve 3 generally represents the variation in amplitudes of reflection events B' and C', and curve 5 generally represents the variation in amplitude of reflection event D'. As such, not only can reflection events associated with gradational changes in elastic impedance be distinguished from step-like changes but reflection events associated with the blocky step-down step-up change in elastic impedance D, generally associated with thin bed formations, can be distinguished from reflection events associated with the more common steplike changes in elastic impedance. In particular, by comparing their respective measures for $w_0$ and $w_1$, one can also locate and identify thin bed formations.

The ability to distinguish reflection events associated with step-like from blocky and gradational changes in elastic impedance depends upon accurately measuring the changes in amplitude as a function of the frequency content of the bandpass filtered seismic data. As such, care must be taken to compensate for processing induced variations in amplitude resulting from variations in frequency content of the seismic data. Specifically, those skilled in the art recognize that the frequency domain of a wavelet convolved with a spike-like reflector, associated with a step-like change in elastic impedance, will produce a reflection event having an amplitude proportional to the area defined by the wavelet's amplitude spectrum. To ameliorate the effects of such processing-induced amplitudes changes, it is necessary to normalize or balance the reflection event amplitudes associated with differing frequency content. Thus, any remaining variations in amplitude with varying frequency content can be employed to distinguish reflection events associated with step-like from blocky and gradational changes in elastic impedance.

At step 35, selected reflection events in the original seismic data can be highlighted with colors representative of the polarity and magnitude of the rate of change of amplitude as a function of changing frequency content $w_1$. By way of example, such color can be added to fill either the positive or negative lobe of selected reflection events in the seismic data. This results in a seismic display which can rapidly provide the geophysical interpreter with information as to whether or not a particular reflection event is associated with either steplike or gradational changes in elastic impedance. To avoid the visually complicating feature that peaks and troughs in the seismic signals add to distinguishing values of $w_1 > 0$ from values of $w_1 < 0$, it is preferable to multiply $w_1$ by either the ±sign of the associated seismic signal amplitude or by the ±sign of $w_0$ associated therewith.

Alternatively, a more rapid and simpler, albeit somewhat less accurate, technique for obtaining a measure of the rate of change in amplitude for selected reflection events, as a function of the changing frequency content in the bandpass filtered seismic data, are provided at step 40. In particular, a difference in amplitude $\Delta$ for a selected reflection event having two different frequency contents can be obtained. For example, a measure of the amplitudes for a selected reflection event can be obtained from the bandpass filtered data of step 15 associated with the smallest and widest bandpass filters, i.e., the amplitude associated with the narrowest frequency content $A_l$ and the amplitude associated with the broadest frequency content $A_h$. The difference in amplitudes $\Delta$ (where $\Delta = A_h - A_l$) can be representative of the rate of the change in amplitude as a function of the change in frequency content of seismic data $w_1$. Thus, $\Delta$ can provide a method for identifying stratigraphic prospects associated with gradational changes in elastic impedance. Once again, care must be taken to normalize or balance the amplitudes associated with differing frequency content so as to ameliorate the effects of processing induced variations in amplitude as a function of changing frequency content.

By assigning the difference in amplitude $\Delta$ a color related to both its polarity and magnitude and plotting it with original seismic data at step 45, one can visually estimate whether or not the change in amplitude $\Delta$ increases or decreases with changing frequency content. Thus, stratigraphic prospects exhibiting decreases in amplitude as a function of increasing frequency content can be located. However, such displays are dependent on knowing the original polarity of the seismic data and whether or not the reflection event under examination is a peak or trough.

It is preferable to obtain a measure of the change in amplitude as a function of changing frequency content irrespective of any a priori knowledge of the original polarity of the reflection event (i.e., whether the reflection event is a peak or a trough). As such, the following additional schemes have been developed. First, rather than simply taking the difference in amplitudes $\Delta = A_h - A_l$) associated with the differences in amplitudes for different frequency content seismic data, the difference $\Delta$ can be converted to a percentage difference $\Delta\%$ as follows:

$$\Delta\% = (A_h - A_l)/A_h$$

Thereafter, the percentage difference $\Delta\%$ change in amplitude as a function of frequency content can be color coded according to its polarity and magnitude and plotted with the original seismic data. In fact, stratigraphic prospects having decreasing amplitude with increasing frequency content are now more clearly depicted. Second, rather than directly obtain the difference $\Delta$ in amplitude for selected reflection events from the filtered seismic data itself, an amplitude envelop A can be calculated for the bandpass filtered seismic data and thereafter an envelope difference $\Delta'$ can be determined between the envelope amplitude $A_h$ associated with the high frequency content seismic data and the envelope amplitude $A_l$ associated with the low frequency content seismic data $\Delta' = A_h - A_l$. This envelope difference $\Delta'$ can then be color coded according to its polarity and magnitude and plotted with the original seismic data.

We have also discovered that reflection events associated with gradational changes in elastic impedance have a mean instantaneous frequency $F_G$ which is less than the mean instantaneous frequency $F_M$ of the seismic energy wavelet imparted into the earth and conversely, the instantaneous mean frequency $F_S$ for reflection events associated with step-like changes in elastic impedance is greater than $F_M$. Thus, mean instantaneous frequency can provide another method for distinguishing reflection events associated with either step-like or gradational changes in elastic impedance.

Figure 5:
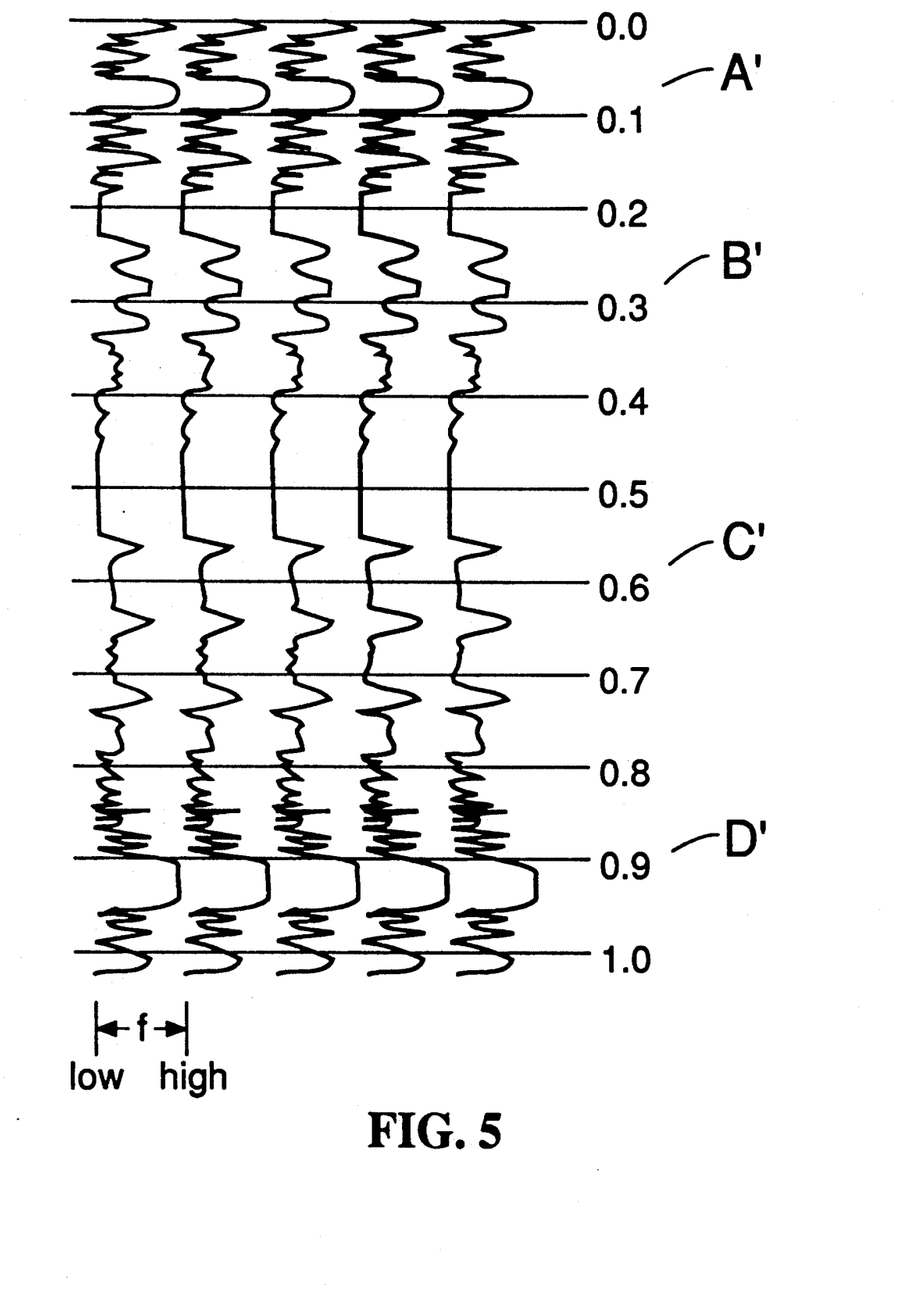
FIG. 5 is a comparison of instantaneous frequency plots for each of the reflection events depicted in the synthetic seismic signals of FIG. 1.

Consequently, at step 50 of FIG. 2, a measure of the mean instantaneous frequency for selected reflection events in the seismic data can be obtained and compared to the mean instantaneous frequency $F_M$ of the seismic energy wavelet imparted into the earth. If the instantaneous frequency is less than the instantaneous mean frequency $F_M$, it is associated with a gradational change in elastic impedance. Whereas, if the instantaneous frequency is greater than the instantaneous mean frequency $F_M$, it is associated with a step-like change in elastic impedance. FIG. 5 provides a comparison of the instantaneous frequency associated with the reflection events A', B', C' and D'. In particular, the reflection events at corresponding time locations show markedly lower instantaneous frequencies at B' and C' than for A' and D' as indicated by the different amplitudes of the instantaneous frequency signals. Specifically, the instantaneous frequency for reflection events A' and D' have a higher instantaneous mean frequency than do the instantaneous frequency for reflection events B' and C'.

Having developed the capability for distinguishing reflection events in seismic data associated with step-like from gradational changes in elastic impedance, other useful results can be obtained with this information. As a first example, a novel method for zero phasing seismic data can also be provided. As used in geophysics, zero phasing seismic data comprises a method of processing seismic data in an attempt to achieve a zero time delay representation of the reflection of seismic energy from reflecting interfaces in the earth. Zero phasing of seismic data is an important processing step to locate reflection events in the seismic data at the time corresponding to the reflection of the seismic energy from a reflecting interface in the earth's subsurface.

While many techniques are available for zero phasing seismic data, most are statistical in nature and generally produce unreliable results. Alternatively, filtering the seismic data with an inverse Wiener-type filter using either known reflection coefficients obtained from well logs or index reflectors from known formation interfaces, e.g., sea floor, top of chalk or salt formations can produce more reliable results. However, the use of such index reflectors is predicated on the assumption that the index reflectors are associated with step TM like changes in elastic impedance. Until now such assumption, if confirmed at all, is generally believed to have been determined from well-logs or the like.

Since we have already described methods for distinguishing reflection events associated with step-like from gradational changes in elastic impedance above, selecting candidate reflection events in the seismic data for an index reflector can now be done readily without the aid of well-logs or the like. All that is then required for zero phasing the seismic data is to develop an appropriate inverse Wiener filter with such index reflector.

Figure 6:
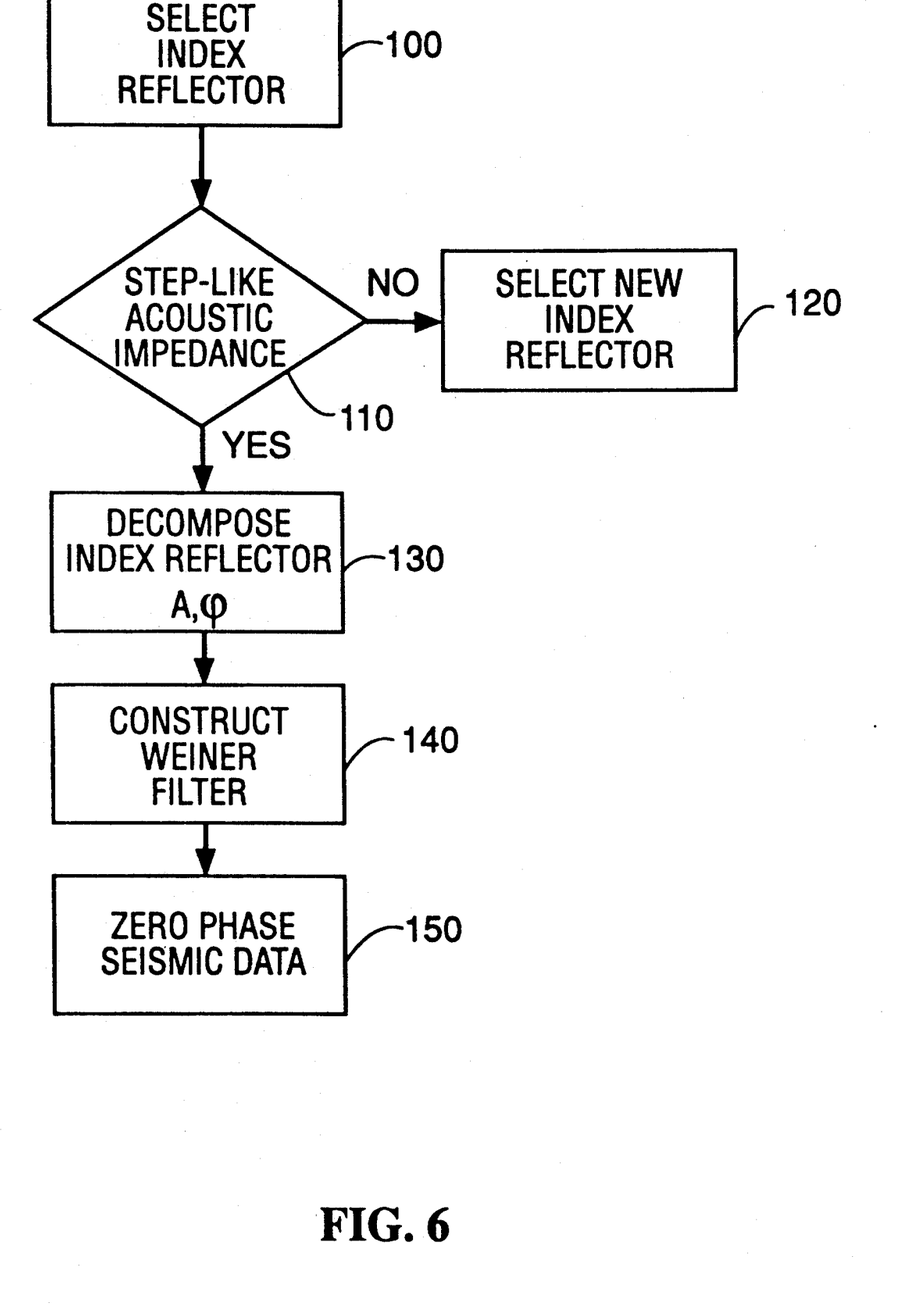
FIG. 6 is a flow diagram for constructing filters to zero phase seismic data employing an index reflector associated with step-like changes in elastic impedance.

Looking now to FIG. 6, a flow diagram for constructing an inverse Wiener filter to zero phase the seismic data is described. In particular, a geophysical interpreter selects a reflection event in the seismic data as a candidate index reflector at step 100. At step 110, the candidate index reflector is evaluated using any one of the previous methods described in connection with the flow diagram of FIG. 2 for distinguishing reflection events associated with step-like from gradational changes in elastic impedance. If the candidate index reflector is determined to be associated with a gradational change in elastic impedance, the geophysical interpreter selects a new reflection event as a candidate for the index reflector at 120. Alternatively, if the reflection event is determined to be associated with a step-like change in elastic impedance, the reflection event can be labeled an index reflector. At step 130, the index reflector can be decomposed into its amplitude spectrum (i.e., a plot of amplitude A(f) versus frequency) as well as phase spectrum (i.e., a plot of phase $\phi(f)$ versus frequency). Knowing the phase spectrum $\phi(f)$ and amplitude spectrum A(f) for the index reflector, those skilled in the art will recognize that an inverse Wiener-type filter can readily be constructed at 140. At step 150, the inverse Wiener-type filter can be impressed on the seismic data so as to zero phase the seismic data.

Additionally, it is generally recognized that the pore fluid pressure in subsurface formations is generally affected by both formation density ($\rho$) and velocity of propagation ($V_p$). As a general rule of thumb, both density $\rho$ and velocity of propagation $V_p$ change gradually as a function of depth. Since elastic impedance Z is defined to be a product of density and velocity, we have discovered that anomalous changes in pore fluid pressure (i.e., greater than hydrostatic) can more likely than not be associated with a gradational change in elastic impedance rather than with step-like changes in elastic impedance. Thus, identifying reflection events in the seismic data associated with gradational changes in elastic impedance can provide a novel method for locating anomalous changes in pore fluid pressure in the earth's subsurface.

While particular embodiments of the present invention have been disclosed for identifying and locating reflection events in seismic data associated with both step-like and gradational changes in elastic impedance as well as for using such results to further process and interpreting the seismic data, it is not intended that the invention be limited thereby. As such, it will be apparent to those skilled in the art that various changes and modifications may be made to the invention as described without departing from the scope of appended claims.

We claim:

1. A method of geophysical exploration, comprising the steps of:
   (a) bandpass filtering a set of seismic data with a plurality of bandpass filters, wherein the set comprises normal moveout corrected an stacked seismic signals and each of the bandpass filters is adapted to pass a selected pass band of frequency; and
   (b) evaluating changes in amplitude as a function of varying pass band frequencies for identifying reflection events in the set of seismic data associated with gradational changes in the earth's elastic impedance for locating changes of formation pore fluid pressure greater than hydrostatic.

2. A method of geophysical exploration, comprising the steps of:
   (a) bandpass filtering a set of seismic data with plurality of bandpass filters, wherein each bandpass filter is adapted to pass a selected pass band of frequencies $\Delta f_i$;
   (b) obtaining a measure of change in amplitudes for selected reflection events in the bandpass filtered seismic data as a function of the frequency content of each pass band $\Delta f_1$, wherein changes in amplitude are curve fitted to a function of the frequency content of each pass band $\Delta f_i$; and
   (c) employing such measure of change for distinguishing reflection events associated with gradational changes in elastic impedance from those associated with step-like changes in elastic impedance.

3. The method of claim 2, wherein the band pass filters comprise a series of overlapping pass bands $\Delta f_i$.

4. The method of claim 3, wherein the bandpass filters comprise a series of filter pass bands $\Delta f_i$ having overlapping pass bands and the lower frequency in each pass band is substantially the same.

5. The method of claim 3, wherein the bandpass filters comprise a series of filter pass bands $\Delta f_i$ having overlapping pass bands and the higher frequency in each pass band is substantially the same.

6. The method of claim 2, wherein the bandpass filters comprise a series of adjacent pass bands $\Delta f_i$.

7. The method of claim 2, further including producing a display of the pass band filtered seismic data, wherein the filtered seismic data are arranged according to increasing frequency content of each pass band.

8. The method of claim 5, wherein the step of obtaining a measure includes:
   (a) fitting the measures of amplitude for the selected reflection event to a function of changing frequency according to:

$$A(f) = w_0 = w_1 f_u$$

where $A(f)$ = amplitude and $f_u$ is a frequency representative of the frequencies of each bandpass and $w_0$ and $w_1$ are coefficients of fit; and
   (b) employing $w_0$ and $w_1$ to distinguish reflection events associated with gradational changes in elastic impedance from those associated with step-like changes in elastic impedance.

9. A method of geophysical exploration, comprising the steps of:
   (a) bandpass filtering seismic data with first and second bandpass filters, wherein the first pass band $\Delta f_1$ is broader than the second pas band $\Delta f_2$; yet, includes the frequencies of pass band $\Delta f_2$; and
   (b) obtaining a measure of the difference in amplitude $\Delta$ between the first and second bandpass filtered seismic data for distinguishing reflection events in the seismic data associated with gradational changes in the earth's elastic impedance from those associated with step-like changes in the earth's elastic impedance, wherein such difference in amplitude $\Delta$ comprises:

obtaining a measure of the amplitude $A_1$ for a selected reflection event in the first band passed seismic data;

obtaining measure of the amplitude $A_2$ for a selected reflectance event in the second band passed seismic data; and obtaining a measure of the percentage change in amplitude $\Delta\%$ according to:

$$\Delta\% = \frac{A_1 - A_2}{A_1}$$

10. The method of claim 9, further including the steps of:
    (a) color coding the difference in amplitude $\Delta$ according to its polarity and magnitude; and
    (b) plotting the color coded difference in amplitude $\Delta$ with the original set of seismic data.

11. A method of geophysical exploration, comprising the steps of:
    (a) bandpass filtering a set of seismic data with at least two bandpass filters having pass bands $\Delta f_1$ and $\Delta f_2$, wherein $\Delta f_1 \neq \Delta f_2$;
    (b) obtaining a measure of the difference in amplitude for selected reflection events in each of the bandpass filtered sets of seismic data, wherein the difference in amplitudes is obtained according to:

$$\Delta = A_1 - A_2$$

where $A_1$ is the amplitude of the reflection event in seismic data bandpass filtered with pass band $\Delta f_1$ and $A_2$, is the amplitude of the reflection event in the seismic data bandpass filtered with pass band $\Delta f_2$; and (c) color coding the difference in amplitude according to its polarity and magnitude and plotting it with the original seismic data for distinguishing reflection events associated with gradational changes in the earth's elastic impedance from those associated with step-like changes in the earth's elastic impedance.

12. The method of claim 11, wherein the frequency content of pass band $\Delta f_1$ is broader than $\Delta f_2$.

13. The method of claim 11, wherein the difference in amplitude is further obtained according to:

$$\Delta\% = \frac{A_1 - A_2}{A_1}$$

where $A_1$ is the amplitude of the reflection event in seismic data band pass filtered with pass band $\Delta f_1$ and $A_2$ is the amplitude of the reflection event in the seismic data band pass filtered with pass band $\Delta f_2$.

14. The method of claim 11, wherein the set of seismic data comprises amplitude envelope signals of the seismic signals comprising the seismic data.

15. A method of processing geophysical data, comprising the steps of:
  (a) evaluating changes in amplitude as a function of varying frequency content for selected reflection events in the set of seismic data;
  (b) identifying reflection events in seismic data having changes in amplitude as a function of varying frequency content associated with step-like changes in the earth's formation elastic impedance;
  (c) constructing a filter for zero phasing the seismic data with characteristics of the identified reflection event associated with step-like changes in elastic impedance; and
  (d) obtaining a measure of the instantaneous frequency for a selected reflection event and comparing it to the instantaneous frequency of the seismic reflection events associated with step-like changes in elastic impedance from those associated with gradational changes in elastic impedance.

* * * * *

UNITED STATES PATENT AND TRADEMARK OFFICE
CERTIFICATE OF CORRECTION

PATENT NO. : 5,136,552
DATED : August 4, 1992
INVENTOR(S) : Michael C. Kelly, et al.

It is certified that error appears in the above-identified patent and that said Letters Patent is hereby corrected as shown below:

| Col. | Line | |
|---|---|---|
| 1 | 2 | "Metod of Geophysical Exploration" should read --Method of Geophysical Exploration-- |
| 1 | 24-5 | "amplitude and variations" should read --amplitude events in seismic signals or traces, i.e., bright spots, and variations-- |
| 8 | 33 | "step TM like changes" should read --step-like changes-- |
| 9 | 36 | "corrected an stacked" should read --corrected and stacked-- |
| 10 | 30 | "second pas band" should read --second pass band-- |
| 10 | 17 | "$A(f)=w_0 =w_1f_u$" should read -- $A(f) = w_0 + w_1f_u$ -- |

Signed and Sealed this

Twelfth Day of October, 1993

Attest:

BRUCE LEHMAN

Attesting Officer

Commissioner of Patents and Trademarks